Patented June 17, 1941

2,246,396

UNITED STATES PATENT OFFICE 2,246,396

REDUCTION OF CHROMATES TO PRODUCE CHROMIC OXIDE

Omar F. Tarr, Stoneleigh, and Llewellyn G. Tubbs, Baltimore, Md., assignors to Mutual Chemical Company of America, New York, N. Y., a corporation of New Jersey No Drawing. Application June 7, 1938, Serial No. 212,388

2 Claims. (Cl. 134—58)

This invention relates to improvements in the reduction of alkali chromates and the production of hydrated chromic oxide therefrom.

According to the present invention alkali chromates are reduced and hydrated chromic oxide formed by the gradual and controlled addition of a chromate solution to an alkaline suspension of sulfur in a sodium sulfide solution.

It has heretofore been proposed to reduce alkali chromates by heating together a solution of the chromate and a suspension of sulfur in sodium sulfide; and also by adding an alkaline suspension of sulfur gradually to a hot chromate solution. Such methods have the objection that the reaction is slow to start, exothermic and not under control; furthermore the sulfur dissolves slowly and always in the presence of an excess of chromate which excess changes as the reaction proceeds.

We have found that these difficulties can be overcome, and the reduction of the chromate carried out in a simple and advantageous and controlled manner, by gradually adding the chromate solution to the heated alkaline aqueous emulsion of sulfur. We have found that by proceeding in this way the reaction starts immediately since the alkaline sulfur emulsion contains an excess of alkali sulfides. We have found that the difficulty due to slow solution of sulfur is eliminated since the alkali is emulsified with the sulfur without any excess of chromate liquor being present. In the present process there is no changing concentration of chromate since all the chromate is immediately consumed and reduced as it is added to the sulfur emulsion. The process proceeds in the absence of excess chromate, and the added chromate is immediately reduced by the alkaline sulfide solution which is present in excess as the chromate is gradually added and immediately reduced.

The sulfur emulsion used in carrying out the present process can be readily produced in a number of ways which are well known such as for example from caustic soda and sulfur, using an excess of sulfur which will in part initially dissolve as a sodium sulfide and which in part will progressively dissolve as a sodium sulfide as the process proceeds.

This sulfur emulsion is advantageously maintained at or near the boiling point while the chromate solution is being added. With effective stirring the added chromate is immediately reduced so that no excess of chromate is present, and so that an excess of alkaline sulfide is present to act upon the progressively added chromate and to reduce it immediately to the hydrated oxide.

The invention will be illustrated by the following example, but it will be understood that it is not limited thereto:

A sulfur emulsion is prepared by emulsifying 192 pounds of powdered sulfur in 60 gallons of boiling water containing 20 pounds of caustic soda (NaOH) in a suitable reaction kettle. This results in the formation of a solution containing sodium sulfide and polysulfides. This sulfur emulsion is held at or near the boiling point and a solution of sodium chromate made by dissolving 648 pounds of sodium chromate ($Na_2CrO_4$) in 160 gallons of warm water is slowly added with stirring of the emulsion during such addition. This addition may require, for example, about two hours. The resulting suspension may be boiled a further short period with continued stirring. The green sludge of hydrated chromic oxide is then separated from the sodium thiosulphate liquor, for example, by settling or filtration. This green sludge contains all of the chromium in the form of a hydrous chromic oxide ($Cr_2O_3 \cdot XH_2O$), together with some sodium salts or alkali.

Considering the sulfur of the alkali sulfide as the reducing agent, the reaction produces sodium thiosulfate and caustic soda according to the following general type of reaction:

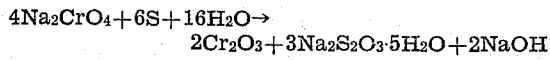

$$4Na_2CrO_4 + 6S + 16H_2O \rightarrow 2Cr_2O_3 + 3Na_2S_2O_3 \cdot 5H_2O + 2NaOH$$

The amount of water present is larger than that indicated by the above equation, and caustic soda or sodium sulfide or polysulfide or a mixture of these is also present. As the reaction proceeds the amount of thiosulfate increases and the amount of caustic soda also increases. As the sulfur of the sodium sulfide is used up in reducing the chromate, additional sulfur is dissolved so that, with regulated addition of the chromate solution, an excess of alkali sulfide is present and the sulfur progressively dissolves, while excess of chromate is absent, since the chromate is immediately reduced and precipitated as hydrated or hydrous chromic oxide.

The thiosulfate formed constitutes a valuable byproduct and can be recovered and purified by known methods.

The hydrated chromic oxide produced by the present process is in a form which permits ready treatment to remove associated sodium salts. This further purification and removal of sodium salts can be effected by different methods of procedure.

One advantageous method of removing sodium compounds from the crude hydrous chromic oxides is by treatment with ammonium chloride, as illustrated by the following example:

100 pounds of crude hydrous chromic oxide analyzing, for example, 55% water, 40% $Cr_2O_3$ and 5% sodium salts are stirred into a hot solution of ammonium chloride made by dissolving 100 pounds of ammonium chloride ($NH_4Cl$) in 50 gallons of hot water. This suspension may be digested, for example, for 2 to 5 hours at 50 to 70° C. and then separated by filtration, followed by washing with water. This treatment removes substantially all of the tightly held sodium salts.

The hydrous chromic oxide, suitably freed from sodium salts may advantageously be used for the manufacture of green chromic oxide pigments by heating to a high temperature, e. g., to a temperature around 2400° F. for a period of about 15 minutes.

Improved pigments can be made from the hydrous chromic oxide by attrition of the aqueous slurry of the hydrous oxide in a ball mill with an electrolyte such as aluminum sulfate prior to calcining. In such treatments the chromic oxide pigment may contain, by way of example, 5 to 10% aluminum oxide ($Al_2O_3$).

We claim:

1. The method of reducing alkali chromates and of producing hydrous chromic oxide which comprises gradually adding an alkali chromate solution to a hot, aqueous, alkaline emulsion of sulfur and sodium sulfide, whereby the alkali chromate is immediately reduced by the excess alkaline sulfur emulsion with avoidance of excess chromate during the process, and separating the hydrous chromic oxide from the reaction mixture.

2. The process of producing chromic oxide pigments which comprises gradually adding an alkali chromate solution to a hot, aqueous, alkaline emulsion of sulfur and alkali sulfide, whereby the alkali chromate is immediately reduced by the excess alkaline sulfur emulsion with a voidance of excess chromate during the process, with the resulting production of hydrous chromic oxide admixed with alkali salts, removing alkali salts from the resulting hydrous chromic oxide by washing the same with a solution of a thermally decomposable aluminum salt which on decomposition leaves only alumina as a residue, and heating the purified hydrous oxide to decompose remaining aluminum compounds and to produce an anhydrous chromic oxide pigment.

OMAR F. TARR.
LLEWELLYN G. TUBBS.